No. 762,402. PATENTED JUNE 14, 1904.
P. HANSON.
KNOTTER MECHANISM FOR GRAIN BINDERS.
APPLICATION FILED OCT. 4, 1901.
NO MODEL. 4 SHEETS—SHEET 2.

Witnesses:
J B Weir
Ira D Perry

Inventor:
Paul Hanson
By Brown & Darby
Attorneys

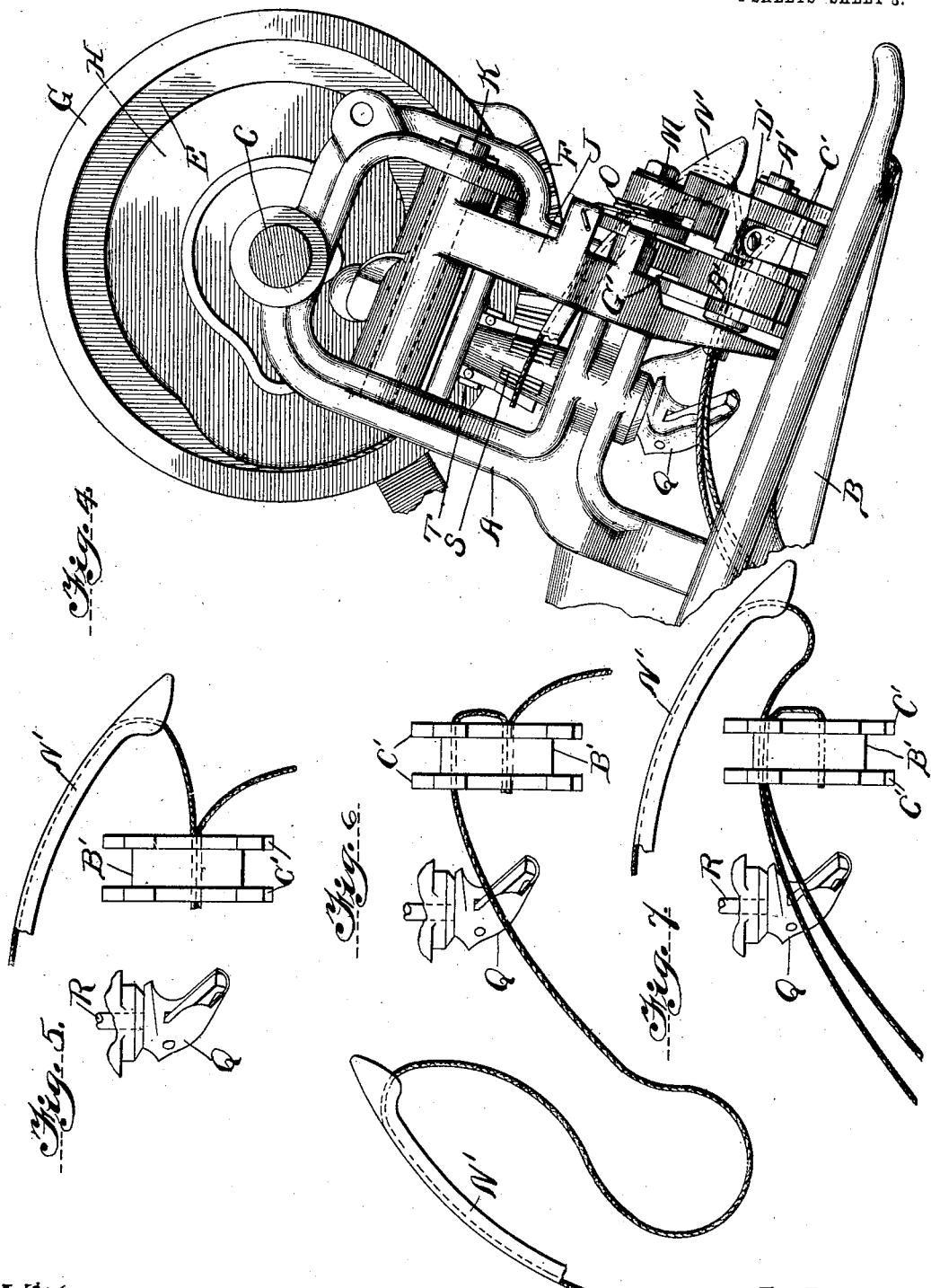

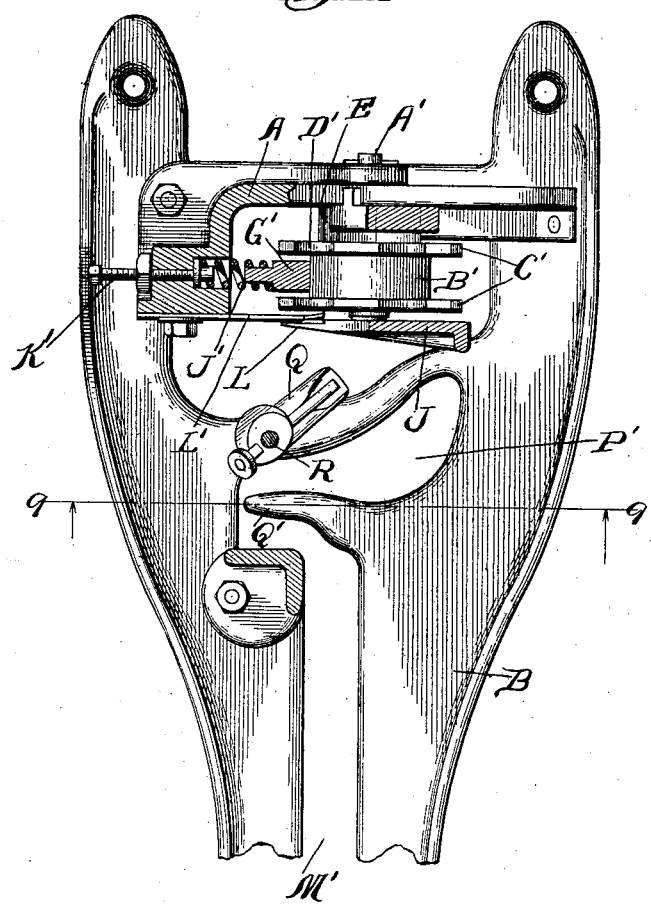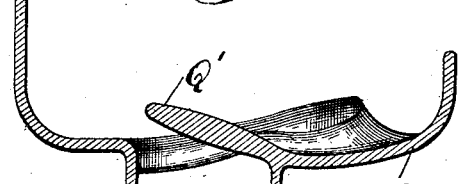

No. 762,402.

Patented June 14, 1904.

UNITED STATES PATENT OFFICE.

PAUL HANSON, OF ST. PAUL, MINNESOTA.

KNOTTER MECHANISM FOR GRAIN-BINDERS.

SPECIFICATION forming part of Letters Patent No. 762,402, dated June 14, 1904.

Application filed October 4, 1901. Serial No. 77,524. (No model.)

*To all whom it may concern:*

Be it known that I, PAUL HANSON, a citizen of the United States, residing at St. Paul, in the county of Ramsey and State of Minnesota, have invented a new and useful Improvement in Knotter Mechanism for Grain-Binders, of which the following is a specification.

This invention relates to knotter mechanism for grain-binders.

The object of the invention is to simplify and improve the construction of knotter mechanism for grain-binders and to render the same more efficient in operation.

A further object of the invention is to provide a construction of knotter mechanism specially adapted for use with grass twine as the binder-twine.

Other objects of the invention will appear more fully hereinafter.

The invention consists, substantially, in the construction, combination, location, and relative arrangement of parts, all as will be more fully hereinafter set forth, as shown in the accompanying drawings, and finally specifically pointed out in the appended claims.

Figure 1:
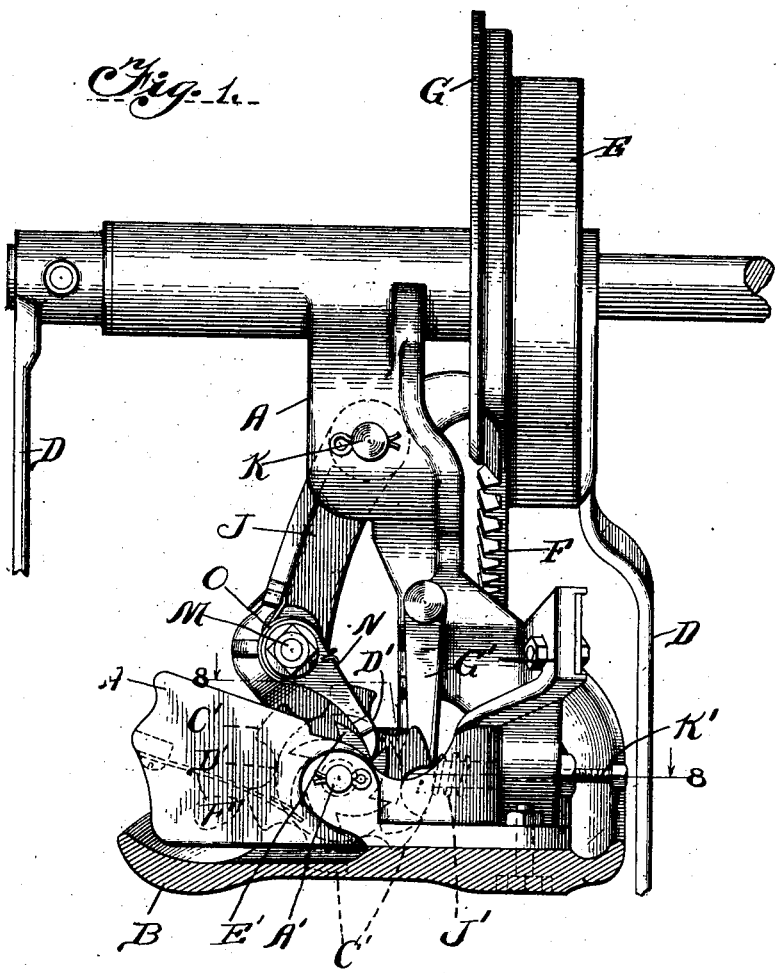
Figure 2:
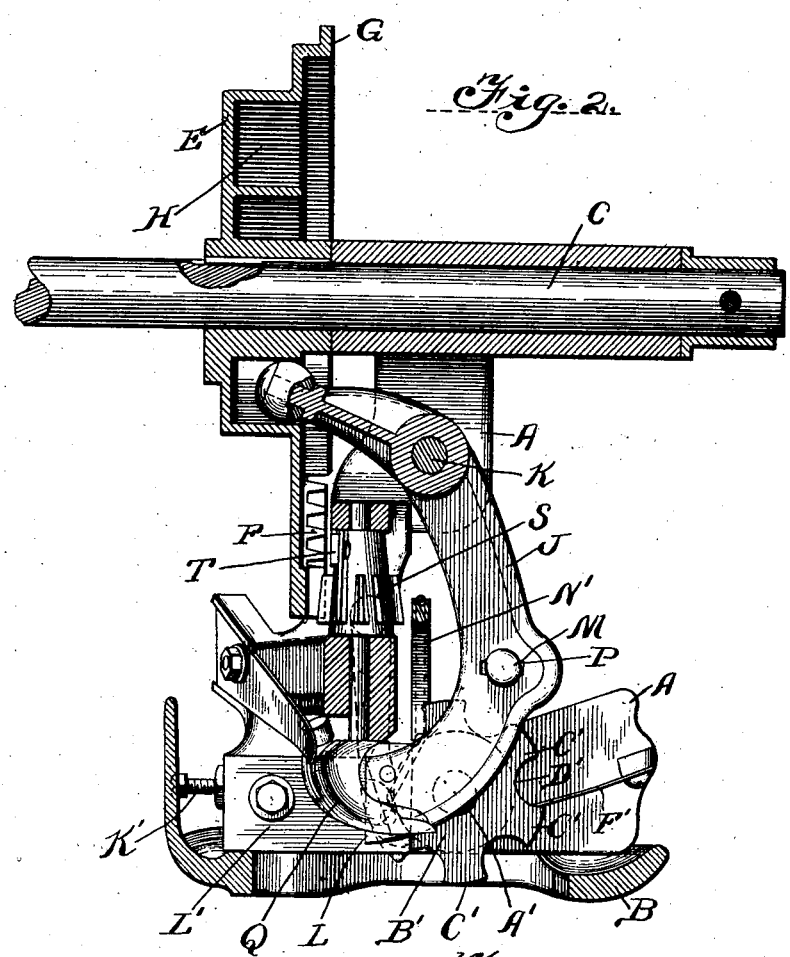
Figure 3:
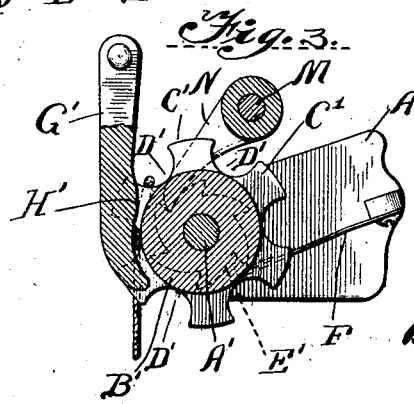

Referring to the accompanying drawings and to the various views and reference-signs appearing thereon, Figure 1 is a view in elevation looking from the discharge side of the machine. Fig. 2 is a vertical section taken longitudinally of the cam-shaft. Fig. 3 is a detached detail view in section showing the construction and arrangement of cord-clamp. Fig. 4 is a view in side elevation, the cam-shaft being in transverse section. Figs. 5, 6, and 7 are detail views, somewhat diagrammatic, illustrating various stages in the operation of the apparatus. Fig. 8 is a horizontal section on the line 8 8, Fig. 1, looking in the direction of the arrows. Fig. 9 is a view in transverse section on the line 9 9 of Fig. 8 across the breastplate.

The same part is designated by the same reference-sign wherever it occurs throughout the several views.

In the accompanying drawings, reference-sign A designates the framework upon which is supported the various operating parts of the knotter mechanism, and B the breastplate. Suitably journaled in bearings formed in the framework A is the knotter-operating shaft C, adapted to receive periodic rotation by mechanism not shown, but which, however, may be of the usual or any well-known construction or arrangement and upon which shaft are mounted discharge-arms D and the knotter-wheel E. This knotter-wheel is provided with the usual rack-teeth F, extending for a portion only of the periphery thereof, said rack-teeth being formed on the face of said wheel.

G designates a delay-surface formed on the face of the knotter-wheel in the usual manner, and H designates a cam-groove in which operates one end of a lever J, said lever being pivotally mounted intermediate its ends, as at K, in the framework A. Upon the opposite end of said lever is mounted the knife L, by which the binding-twine is severed after the completion of the knot-tying operation and when the tied bundle is ready to be discharged from the machine. The lever J is also provided with an extension rod or bolt M, upon which is pivotally mounted a pawl N. O designates a spring arranged to operate on said pawl to yieldingly maintain the engaging end thereof in proper relation, as will presently be more fully explained. If desired, and in order to properly adjust the pin or stud O, said pin or stud may be mounted in an elongated slot P in lever J. (See Fig. 2.)

Q designates the knotter-bill, which may be of the usual construction, and upon the shaft R of said knotter-bill is mounted a pinion S, arranged to be engaged by the rack-teeth F, whereby rotary movement is imparted to the knotter-bill. Carried by or formed on pinion S is a bearing-plate T, arranged to coöperate with the delay-surface G to lock the pinion S against rotation during that portion of the rotative movement of the knotter-wheel E when rack-teeth F are out of mesh with the teeth of pinion S in the usual manner of mechanisms of this class.

Suitably mounted in bearings formed in framework A is a stud or pin A', upon which is journaled the cord-holder. This cord-holder comprises a cylindrical block B', having flanges at the ends thereof, said flanges being formed into the shape of teeth or projections C', the planes of which extend transversely of the axis of the cylindrical block B' and having seats or depressions D' between adjacent teeth or projections C', said seats or depressions being enlarged and the bottoms thereof extending approximately to the peripheral surface of the cylindrical block B'. Suitably mounted on or connected to the cord-holder block is a ratchet-wheel E', with the teeth of which the pawl N engages. Upon a convenient part of the frame A is mounted a spring or spring-pawl F', arranged with its engaging end in reverse relation with respect to the engaging end of actuating-pawl N and to engage the ratchet-teeth E' upon the opposite side of the bearing-stud A', said spring or spring-pawl serving to lock said ratchet after each actuation thereof. Pivotally mounted or suspended upon a convenient part of the framework A is a clamp arm or lever G', having the free end thereof depending between the sets of teeth C' at the ends of cord-holder block B' and arranged to bear against the peripheral surface of the cylindrical block B'. The surface of the clamp-arm G' which is presented to the peripheral surface of the cord-holder block B' is preferably slightly curved to correspond to and coöperate with the curvature of the peripheral surface of the cord-holder block B', said slightly-curved surface of the cord-holder arm or lever commencing with a slight projection or bulge H'. (See Fig. 3.) In order to yieldingly maintain the cord-holder arm or lever G' in efficient contacting relation with respect to the peripheral surface of block B' a spring J' is arranged to bear against the outer edge of said clamp-arm G'. The tension of said spring may be adjusted in any suitable manner, as by means of the set-stud K'. The teeth or depressions D' between one set of teeth C' are arranged in registering relation with respect to the seats or depressions D' between the opposite set of teeth C', and in the operation of the mechanism the binder-twine is placed in the seats formed by corresponding or coöperating members of each pair of seats or depressions D', and when rotation is imparted to the cord-holder block B' the twine is carried between the bounding-teeth C' of the seats or depressions in which the twine is located and into position for the clamp-arm G' to efficiently press and clamp the same against the peripheral surface of the cylindrical block B', thereby holding and efficiently clamping the twine in the holder, and by enlarging the seats or depressions D' it will be seen that the ends of the twine are clamped substantially between surfaces the line of contact of which is parallel to the axis of the cord-clamp block and is a straight line throughout the length of the portion of twine which is clamped, thus permitting the use of grass binder-twine, which is of larger diameter than the ordinary Manila binder-twine, such as has heretofore been commonly employed for this purpose and without bending the same. At the same time the construction is also adapted for use with binder-twine of the ordinary size and which is just as efficiently clamped and held against the cord-holder block B' by the clamp arm or lever G'.

L' designates a stationary ledger blade or plate suitably mounted upon the framework A and with which the cutting edge L coöperates in severing the cord. The breastplate B is provided with the usual slot or opening M', extending longitudinally thereof, through which the needle N' operates in the usual manner, and one of the bounding edges of the slot or opening M' in the breastplate is provided with a horn or finger Q', which is of usual construction and arrangement, except that said horn or finger is somewhat higher and extends somewhat longer than the horn or finger heretofore employed in this connection, thereby affording the greater portion of slack in the cord for the proper operation of the knotter-bill. The opening M' through the breastplate is also provided with the usual lateral enlarged extension or part P', (see Fig. 8,) through which the formed and tied knot is stripped from the knotter-bill when the bundle is discharged from the machine in the usual manner.

The diagrammatic views Figs. 5, 6, and 7 illustrate different stages in the operation of the apparatus and illustrate the manner in which the needle when advanced to its work forms the loop around the bundle and lays the twine into proper position over the knotter-bill and places the same into proper position in the cord-holder.

The operation is as follows: Referring to Fig. 5, it will be seen that the end of the twine is held in the cord-clamp—that is, between the surface of the cylindrical cord-holder block B' and the cord-clamping arm G' (see Fig. 3)—and the needle is beginning its rearward movement. From the cord-clamp the cord or twine extends direct to the eye of the needle and thence to the ball or supply in the usual manner. When the needle is retracted to its initial position, the bundle is formed in the usual manner against that portion of the twine which extends from the eye of the needle to the cord-clamp. It will be observed that in the interval between the advanced position of the needle and the return movement thereof the cord-clamp B' has rotated one step. Consequently the retracting movement of the needle lays the cord across the cord-holder block B' in the next coöperating pair of seats or depressions D'. After the gavel has been formed the needle is again advanced forwardly and around the formed bundle or gavel, thereby completing the loop of the binding-cord around the gavel. When the needle reaches its advanced position, the two ends of the loop around the gavel occupy proper relation over the knotter-bill, and said ends are placed in proper position in the same coöperating pairs of seats or depressions D' in the cord-clamping block B'. At the same time a rotative movement is imparted to the knotter-wheel E. During the rotation thus imparted to the knotter-wheel the knotter-bill pinion is actuated when the rack-teeth F arrive in position to engage the teeth of the knotter-bill pinion, thereby effecting a tying of the knot. During the remaining portion of the rotative movement of the knotter-wheel the pinion is locked against rotation by reason of the engagement of the delay-surface G with the flat surface T. During this portion of the rotation of knotter-wheel E and after the knot has been tied the lever J is rocked by means of the engagement of the end thereof in the cam-slot H, thereby advancing the knife-edge L and severing the ends of the twine between the point where the knot is formed and the cord-clamp. Before this severing takes place, however, the pawl N engages a tooth of ratchet E' and imparts one step of rotary movement to the block B', thereby carrying the ends of the twine into position to be firmly clamped and held by the clamp-arm G', bearing toward and against the surface of block B'. The bundle is now discharged from the machine and during the discharge thereof is stripped from the knotter-bill, and the needle is returned to its initial position with the end of the cord remaining clamped in the cord-holder and placed by the return movement of the needle in the next coöperating pair of depressions or seats D'.

As above indicated, a construction embodying the principles of my invention is specially adapted and designed for use with grass-twine binder-cord; but at the same time the machine is equally well adapted for use with binder-twine of the ordinary construction. The knotter mechanism of grain-binding machines of the usual type have been found unsatisfactory for handling grass twine by reason of the fact that in most constructions of knotter mechanism, and in the cord-holding mechanisms thereof especially, sharp corners or edges are presented during the clamping operation which frequently cut or break the twine by bending the same and prevent an efficient clamping thereof, and, moreover, grass twine is usually of somewhat larger diameter or size than the ordinary binder-twine, and hence it is difficult to handle the same with knotter mechanism of the ordinary construction. In the construction above set forth these objections are overcome and the cord holding or clamping mechanism presents unobstructed clamping or engaging surfaces, the line of contact of which is practically a straight line, as above explained, and which do not bend, cut, or otherwise injure the twine, while at the same time effecting an efficient clamping and holding of the ends of the twine during the operation of the knotter mechanism.

Having now set forth the object and nature of my invention and a construction embodying the principles thereof, what I claim as new and useful and of my own invention, and desire to secure by Letters Patent of the United States, is—

1. In a knotter mechanism for grain-binders, a cord-clamp comprising a block having radiating teeth, and seats or depressions between such teeth, said seats or depressions terminating substantially flush with the surface of said block, and a clamping-arm operating in contacting relation against the surface of said block and adjacent to said teeth, the line of clamping contact of said surfaces in the direction of the length of the twine when clamped therebetween being a straight line, whereby the cord is clamped without bending the same, as and for the purpose set forth.

2. In a knotter mechanism for grain-binders, a cord-clamp comprising a cylindrical block having radial wings or teeth at each end thereof, the ends of the cord adapted to be placed lengthwise with respect to the axis of said block and between adjacent and corresponding teeth of said sets, the space between said teeth or wings terminating flush with the cylindrical surfaces of said block, in combination with a clamp-arm operating between said sets of wings or teeth to clamp the cord against said block, the contacting surfaces of said arm and block in the line of the length of the cord when clamped therebetween being substantially a straight line, whereby the cord is clamped and held without bending, as and for the purpose set forth.

3. In a knotter mechanism for grain-binders, a cord-clamp including a rotatively-mounted cylindrical block having wings or teeth arranged in sets at each end thereof, adjacent teeth of each set being separated by a seat or depression terminating flush with the surface of said block, in combination with a yieldingly-mounted clamping-arm arranged to operate between said sets of wings or teeth and presenting a clamping or engaging surface to the surface of said block, the ends of the twine or cord to be clamped adapted to be received between the engaging surfaces of said block and arm, the line of contact of said surfaces in the direction of the length of the cord when clamped therebetween being substantially a straight line, as and for the purpose set forth.

In witness whereof I have hereunto set my hand, this 30th day of September, 1901, in the presence of the subscribing witnesses.

PAUL HANSON.

Witnesses:
C. H. SEEM,
S. E. DARBY.